United States Patent
Yu et al.

(10) Patent No.: US 8,066,241 B2
(45) Date of Patent: Nov. 29, 2011

(54) SUPPORTING STRUCTURE AND FLAT PANEL DISPLAY ASSEMBLY USING SAME

(75) Inventors: Hai-Yang Yu, Shenzhen (CN);
Hong-Wei Zhu, Shenzhen (CN);
Er-Zheng Zhao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 352 days.

(21) Appl. No.: 12/432,785

(22) Filed: Apr. 30, 2009

(65) Prior Publication Data
US 2010/0108828 A1 May 6, 2010

(30) Foreign Application Priority Data
Nov. 6, 2008 (CN) .......................... 2008 1 0305408

(51) Int. Cl.
*A47F 5/00* (2006.01)
(52) U.S. Cl. .................. 248/286.1; 248/354.7; 248/917; 248/924
(58) Field of Classification Search .................. 248/154, 248/924, 917, 918, 274.1, 279.1, 310, 313, 248/354.7, 354.6, 298.1, 285.1, 286.1, 292.12; 403/109.1, 109.8; 74/533, 527–528, 535–538; 361/FOR. 104–FOR. 106, 807, 810, 825
See application file for complete search history.

(56) References Cited

U.S. PATENT DOCUMENTS

| | | | | |
|---|---|---|---|---|
| 5,769,369 A | * | 6/1998 | Meinel ........................ | 248/176.1 |
| 5,813,647 A | * | 9/1998 | Chen .......................... | 248/354.7 |
| 6,247,882 B1 | * | 6/2001 | Huang ........................ | 410/151 |
| 6,305,653 B1 | * | 10/2001 | Oldham et al. ............. | 248/177.1 |
| 6,464,555 B1 | * | 10/2002 | Paduano ...................... | 446/227 |
| 6,837,642 B1 | * | 1/2005 | Lin ............................. | 403/109.1 |
| 7,600,728 B2 | * | 10/2009 | Petrick et al. .............. | 248/286.1 |
| 7,813,118 B2 | * | 10/2010 | Burge ........................ | 361/679.41 |
| 7,918,427 B2 | * | 4/2011 | Wang ......................... | 248/278.1 |

* cited by examiner

*Primary Examiner* — Terrell McKinnon
*Assistant Examiner* — Ingrid M Weinhold
(74) *Attorney, Agent, or Firm* — Altis Law Group, Inc.

(57) ABSTRACT

A supporting structure is provided for supporting a flat panel display. The supporting structure includes a brace and a base. The brace includes a chassis and a number of arms movably connected to the chassis. The chassis includes a supporting portion surface, an opposite grasp portion surface, and a side surface connecting the supporting portion surface and the grasp portion surface. The supporting portion surface is positioned against the back surface of the flat panel display. The chassis defines a number of side openings on the side surface from the grasp portion surface and along a direction parallel to the axis of the chassis. The base includes a casing sleeved on the chassis therein. The casing defines a number of cutouts corresponding to the side openings and cooperates with the side openings to define a number of sliding grooves for the arms sliding therein respectively.

19 Claims, 10 Drawing Sheets

SUPPORTING STRUCTURE AND FLAT PANEL DISPLAY ASSEMBLY USING SAME

BACKGROUND

1. Technical Field

The present invention relates to a supporting structure, and particularly to a supporting structure for a flat panel display and a flat panel display assembly using the same.

2. Description of Related Art

A supporting structure is usually mounted on a back of a display for positioning the display. However, a typical supporting structure is customized for a particular flat panel display based on dimension and weight.

Therefore, it is desirable to provide a supporting structure, which can overcome or at least alleviate the above-mentioned problems.

BRIEF DESCRIPTION OF THE DRAWINGS

Many aspects of the present supporting structure should be better understood with reference to the following drawings. The components in the drawings are not necessarily drawn to scale, the emphasis instead being placed upon clearly illustrating the principles of the present supporting structure. Moreover, in the drawings, like reference numerals designate corresponding parts throughout the several views.

DETAILED DESCRIPTION

Embodiments of the present supporting structure will be now described in detail with reference to the drawings.

Figure 1:
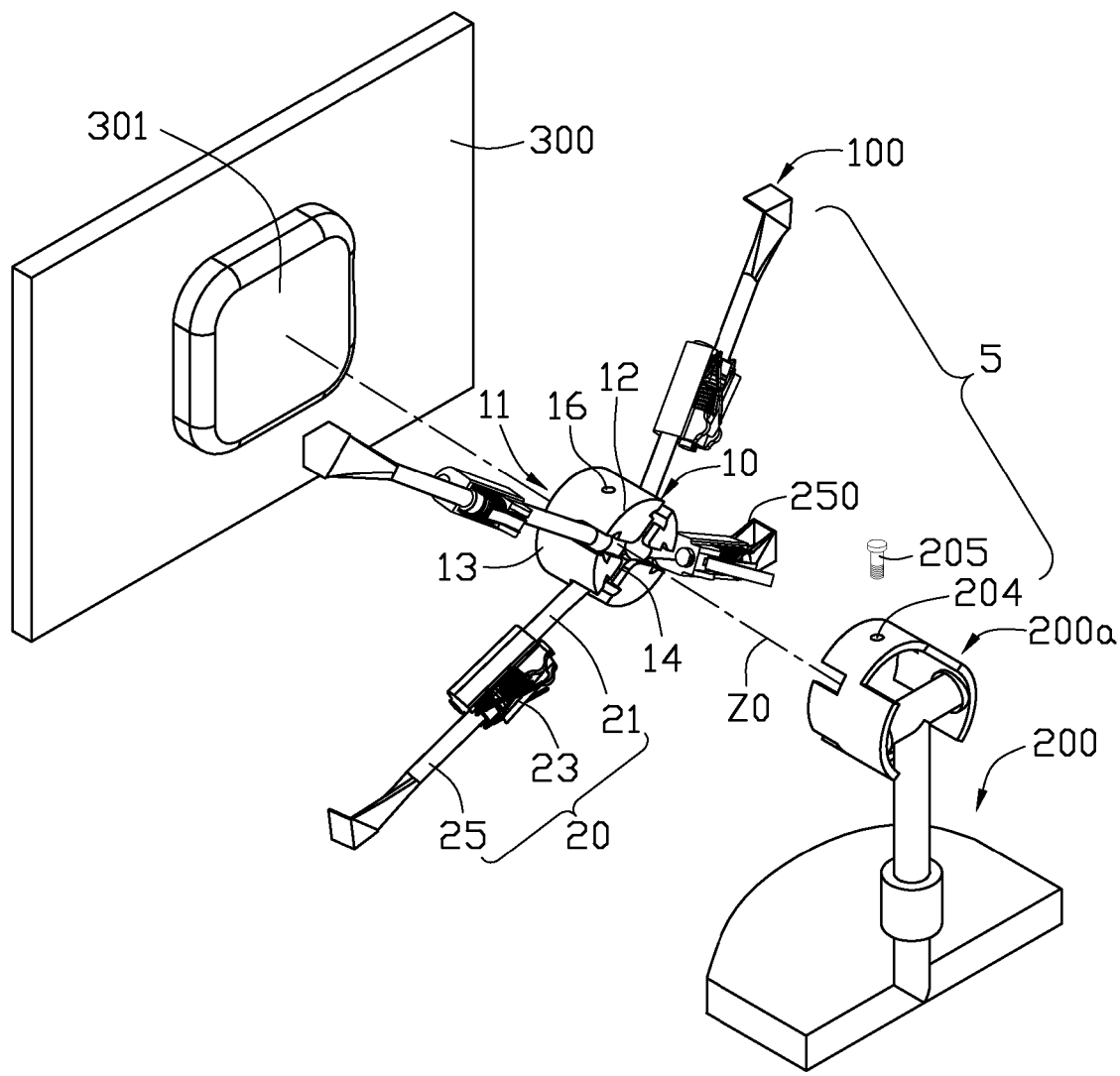
FIG. 1 is an isometric, partially exploded view of a flat panel display assembly including a supporting structure and a flat panel display, according to one embodiment.

Referring to FIG. 1, a flat panel display assembly includes a flat panel display 300 (e.g., a LCD-type display) and a supporting structure 5 to support the flat panel display 300, according to a present embodiment is shown. The flat panel display 300 includes a hump 301 protruding from a back surface. The hump 301 may or may not house electronic components (not shown) and is form of rigid material. That is, the hump 301 may have a definite thickness. The supporting structure 5 includes a brace 100 and a base 200. The brace 100 is fixed to the base 200 and holds the flat panel display 300. The base 200 supports the brace 100.

Figure 3:
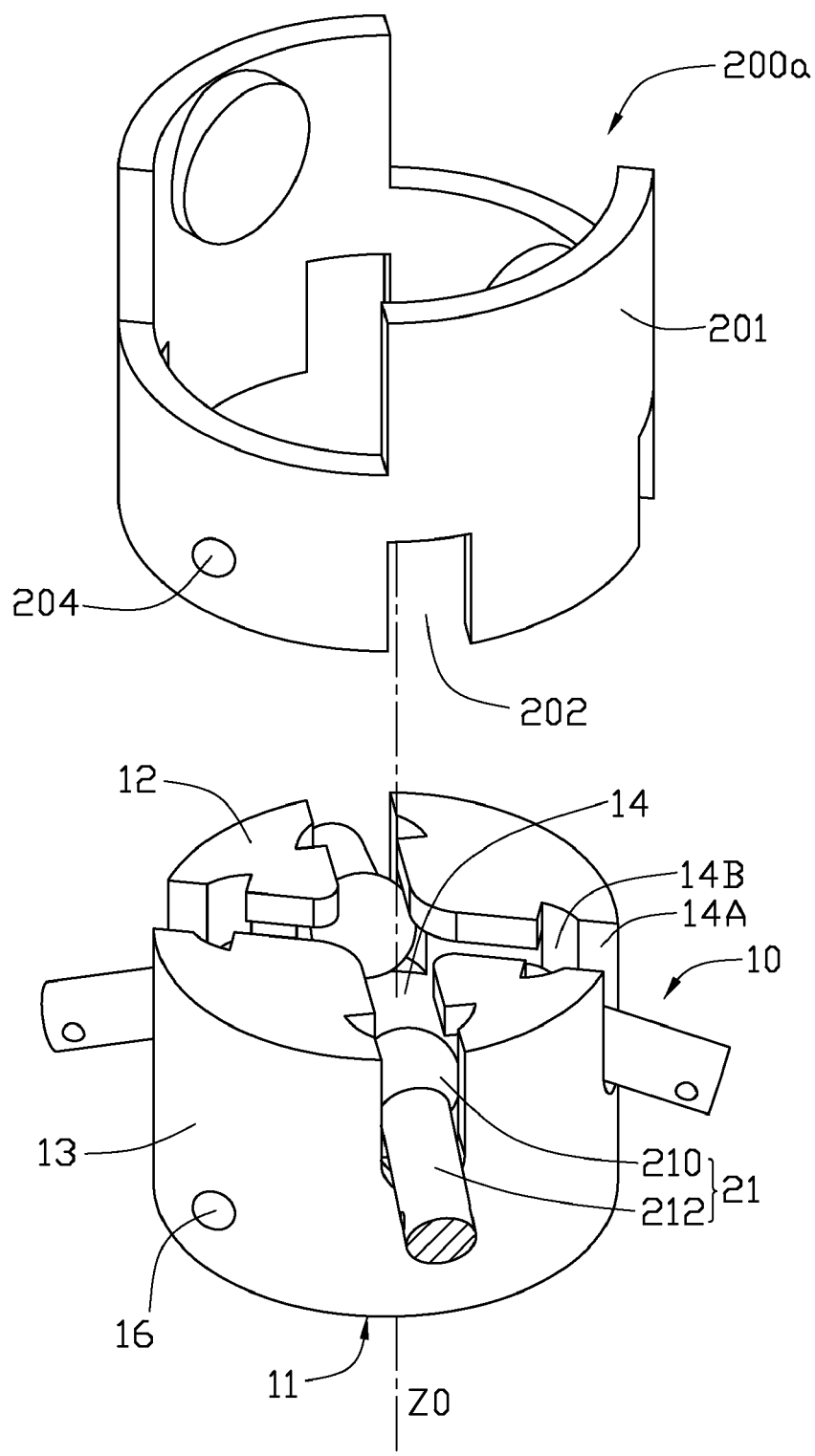
FIG. 3 is a schematic, magnified view of a chassis of the supporting structure of FIG. 1.
Figure 4:
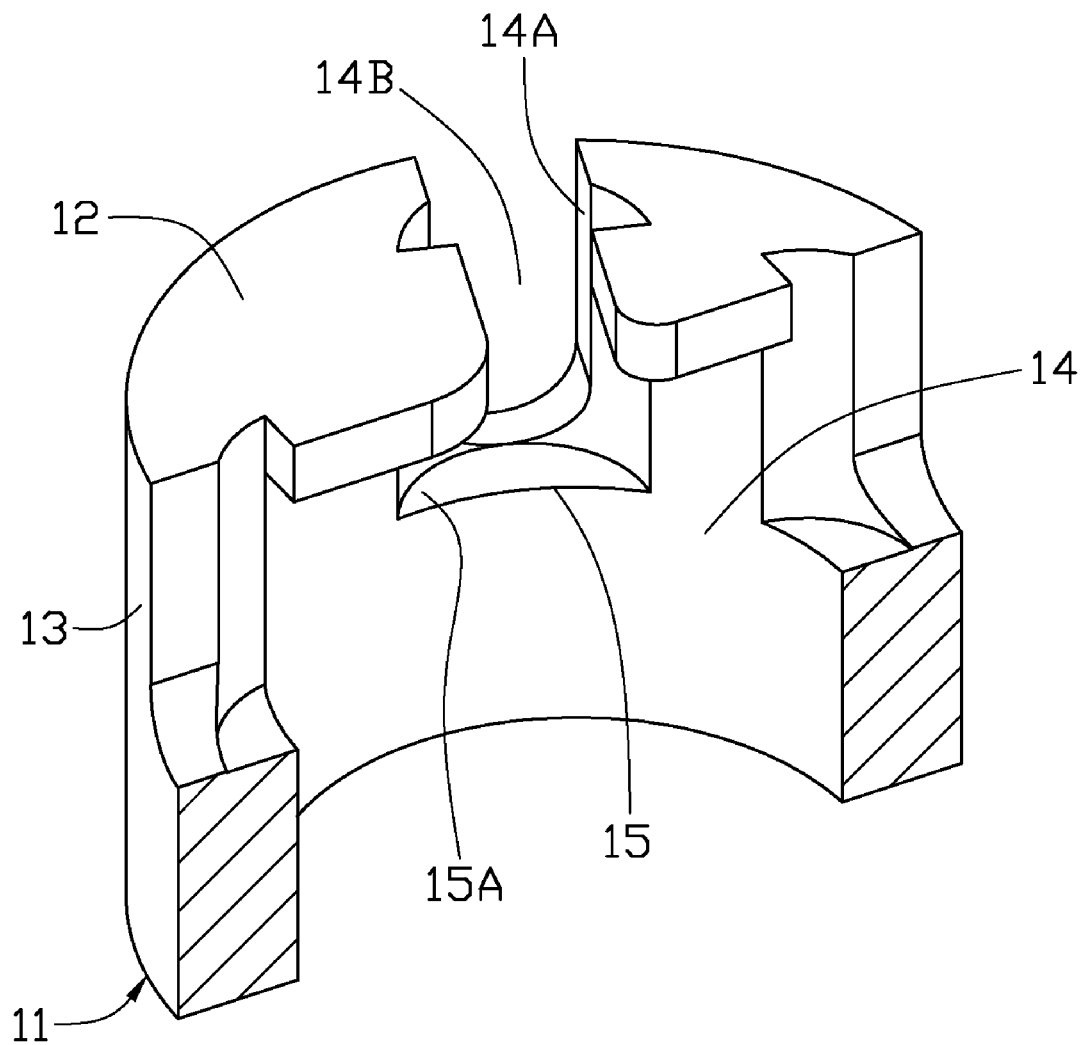
FIG. 4 is a magnified, cut-away view of the chassis of the supporting structure of FIG. 3.

Referring to FIGS. 3 and 4 together with FIG. 1, the brace 100 includes a chassis 10 and a number of arms 20. The chassis 10 includes a supporting portion surface 11, a grasp portion surface 12 opposite to the supporting portion surface 11, and a side surface 13 connecting the supporting and grasp portion surfaces 11, 12. The supporting portion surface 11 abuts the hump 301 of the flat panel display 300. The chassis 10 defines a receiving cavity 14 therein. The chassis 10 further defines a number of side openings 14A in the side surface 13, along a direction parallel to the axis ZO of the chassis 10 and communicating with the receiving cavity 14, and a number of top openings 14B in the grasp portion surface 12 communicating with the side openings 14A and the receiving cavity 14. In this embodiment, the number of the side openings 14A is four. All the top openings 14B communicate with the receiving cavity 14, and together with the receiving cavity 14, look like an X shape. A number of ledges 15 are formed (i.e., structured or arranged) on the inner side surface of the chassis 10 corresponding to the side openings 14A. Each ledge 15 includes a ledge surface 15A facing the grasp portion surface 12 and substantially parallel to the grasp portion surface 12. The distance between the ledge surface 15A and the grasp portion surface 12 is larger than the length of the side openings 14A.

Referring back to FIG. 1, in this embodiment, the brace 100 includes four arms 20 corresponding to the four side openings 14A. Each arm 20 includes a supporting portion 21, a grasp portion 25, and a resilient portion 23 connecting the supporting portion 21 and the grasp portion 25. One end of the supporting portion 21 is rotatably received in the receiving cavity 14. The other end of the supporting portion 21 is adjustably connected with the resilient portion 23. One end of the grasp portion 25 is fixed to the resilient portion 23. The other end of the grasp portion 25 includes a hook 250 that engages with a corner of the flat panel display 300. The shape of the hook 250 is designed to correspond to the shape of the corner of the flat panel display 300.

Referring to FIGS. 1 and 3, the supporting portion 21 includes a spherical portion 210 and an extending portion 212 integrally formed with the spherical portion 210. The spherical portion 210 is received in the receiving cavity 14. The extending portion 212 extends/protrudes out of the chassis 10. The diameter of the spherical portion 210 is smaller than the diameter of the top openings 14B and larger than the diameter of the side opening 14A in the side surface, such that, the spherical portion 210 can be restrictedly disposed into the receiving cavity 14. When the supporting portion 21 is received in the receiving cavity 14, the spherical portion 210 is limited/restricted by the ledge surface 15A of the ledge 15.

Figure 5:
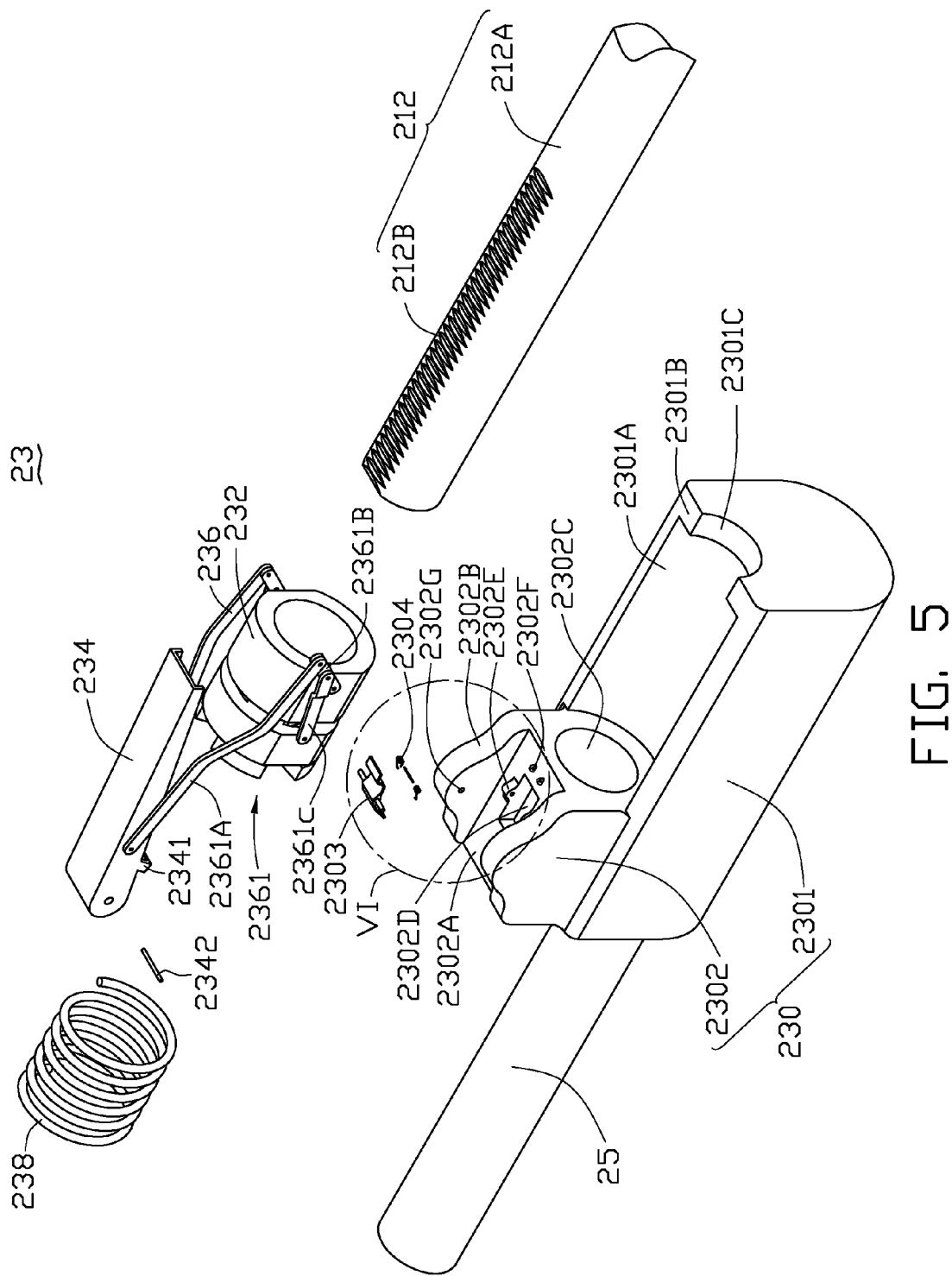
FIG. 5 is an exploded view of a resilient portion of the supporting structure of FIG. 1.

Referring to FIG. 5, the extending portion 212 includes a cylindrical portion 212A formed from the spherical portion 210 and a rack portion 212B on one end opposite to the spherical portion 210. The rack portion 212B includes a number of teeth on the cylindrical surface of the extending portion 212.

The resilient portion 23 includes a joint member 230, a latching member 232, an operating lever 234, and a connecting member 236.

The joint member 230 connects the grasp portion 25 and the extending portion 212 of the supporting portion 21. The joint member 230 includes a receiving portion 2301 and a fulcrum portion 2302. The fulcrum portion 2302 is integrally formed on one end of the receiving portion 2301.

The receiving portion 2301 defines a groove 2301A for receiving the latching member 232. One end of the groove 2301A forms a resisting wall 2301B. The resisting wall 2301B is configured for limiting the movement of the latching member 232. The resisting wall 2301B defines a curved recess 2301C.

The fulcrum portion 2302 supports the operating lever 234 and configured for adjusting the position of the extending portion 212 relative to the receiving portion 2301. The fulcrum portion 2302 includes a top surface 2302A and two first supporting walls 2302B extending from two sides of the top surface 2302A and parallel to each other. The fulcrum portion 2302 defines a through hole 2302C. The top surface 2302A defines an opening 2302D. The opening 2302D communicates with the through hole 2302C. Two second supporting walls 2302E are formed on the top surface 2302A and positioned at opposite sides of the opening 2302D. The second supporting walls 2302E are parallel to the first supporting walls 2302B respectively. Two third supporting walls 2302F are formed on the top surface 2302A and positioned near a side of the opening 2302D and near the extending portion 212.

Figure 6:
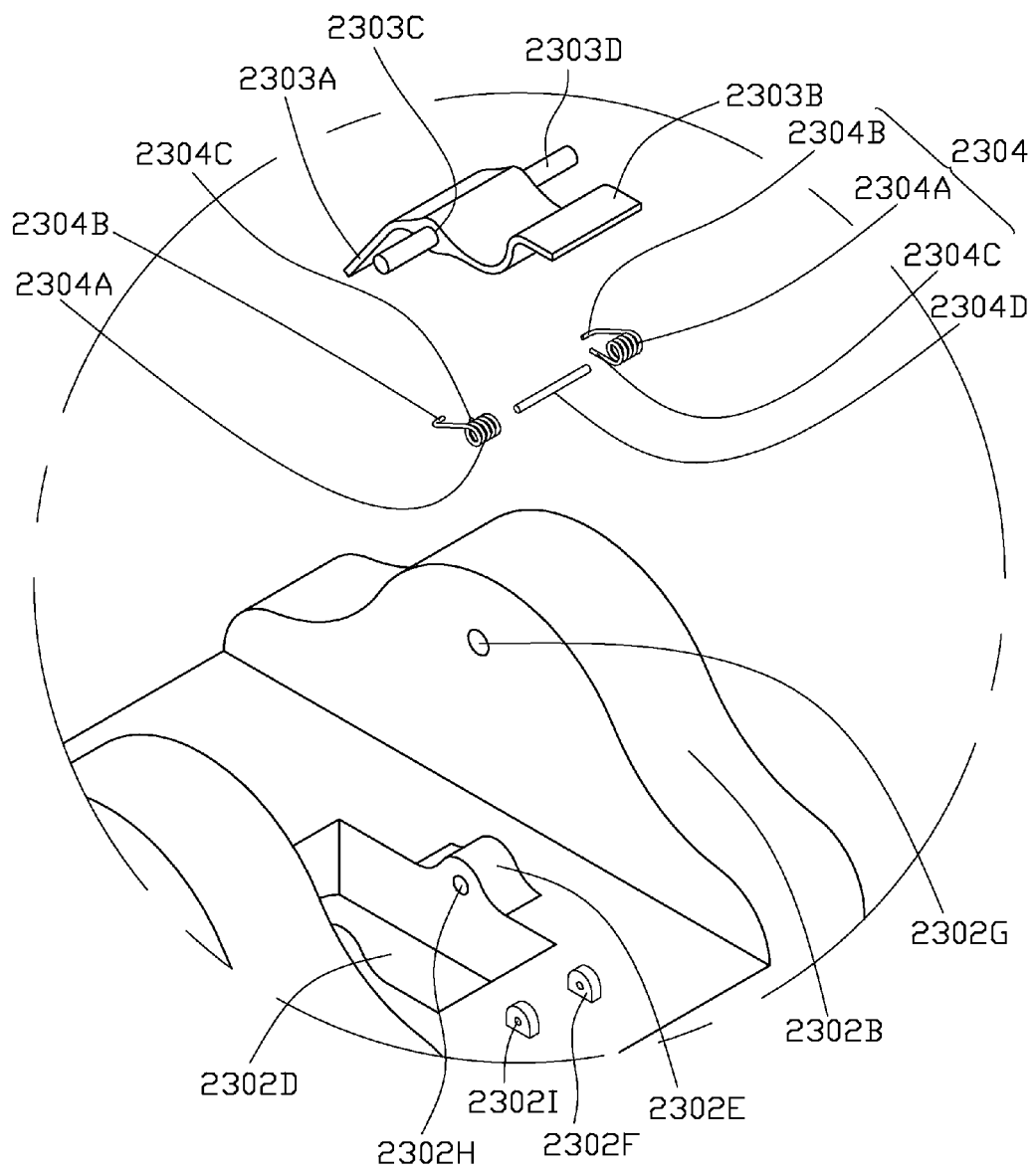
FIG. 6 is a partially enlarged view of VI of FIG. 5.

Referring to FIG. 6, the first supporting walls 2302B defines two first pivot holes 2302G in opposite sides thereof. The second extruding portions 2302E define two second pivot holes 2302H in opposite sides thereof. The third supporting walls 2302F define two third pivot holes 23021 in opposite sides thereof.

Referring FIG. 5 and FIG. 6, the joint member 230 further includes a latching unit 2303. The latching unit 2303 includes a latching end 2303A and a driven end 2303B opposite to the latching end 2303A. The latching unit 2303 defines a fourth pivot hole 2303C in the middle position between the latching end 2303A and the driven end 2303B. A second shaft 2303D passes through the fourth pivot hole 2303C and is fixed in the second pivot holes 2302H. Thereby, the latching unit 2303 is pivotably connected to the fulcrum portion 2302 above the opening 2302D with the latching end 2303A extending into the opening 2302D.

The joint member 230 further includes a resilient unit 2304 driving the driven end 2303B of the latching unit 2303. The resilient unit 2304 includes two torsion springs positioned side by side, each of the torsion springs includes a helix portion 2304A and two resilient ends 2304B, 2304C extending from two ends of the helix portion 2304A correspondingly. The springs are sleeved on a pivot shaft 2304D and ends of the pivot shaft 2304D are inserted into the third pivot holes 2302I. The resilient end 2304B resists the driven end 2303B and the resilient end 2304C resists the latching unit 2303 while the springs are resisting the inner sides of the third supporting walls 2302F.

Figure 7:
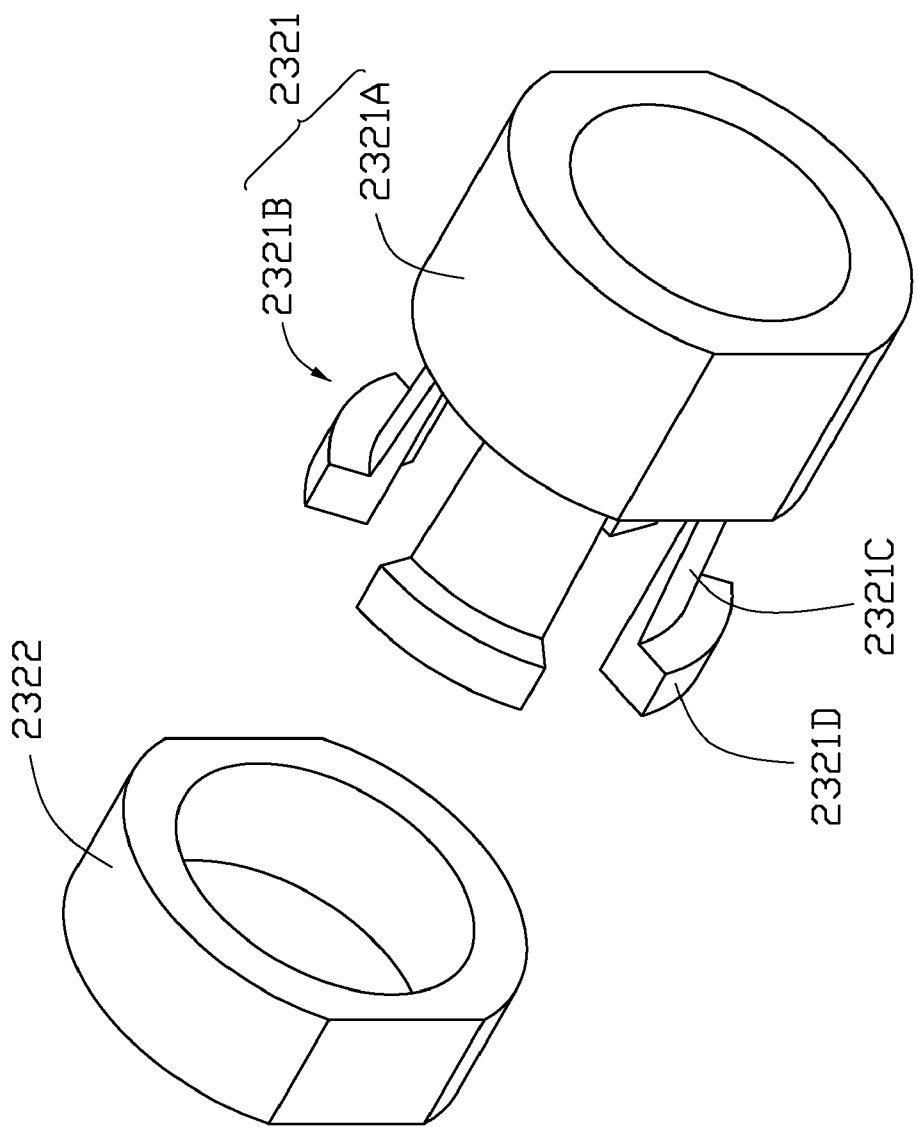
FIG. 7 is an exploded view of a latching member of the resilient portion of FIG. 1.

Referring to FIG. 5 and FIG. 7, the latching member 232 is received in the groove 2301A and grasps the extending portion 212 of the supporting portion 21. The latching member 232 includes a grasp member 2321 and a fastening ring 2322 sleeved on the grasp member 2321. The grasp member 2321 includes a sleeve portion 2321A and a gripping portion 2321B connecting to the sleeve portion 2321A. The gripping portion 2321B includes a number of independent claws 2321C. Each claw 2321C of the gripping portion 2321B is resilient, the fastening ring 2322 is sleeved on the claws 2321C. The thickness of each claw 2321C gradually increases from the sleeve portion 2321A to a distal end thereof. The gripping portion 2321B further includes a limiting block 2321D integerally formed outward on the distal end of each claw 2321C for preventing the fastening ring 2322 from disengaging from the gripping portion 2321B.

Referring to FIGS. 5-7, the operating lever 234 is configured for adjusting the tightness of the extending portion 212 of the supporting portion 21. One end of the operating lever 234 forms a handle 2341 thereon.

The connecting member 236 is configured for connecting the latching member 232 on the operating lever 234. The connecting member 236 includes two link lever portions 2361. Each link lever portion 2361 includes a first lever 2361A, a second lever 2361B and a third lever 2361C. The first link levers 2361A, the second link levers 2361B, and the third link levers 2361C are correspondingly rotatably connected to each other in sequence. One end of the first link lever 2361A is rotatably connected to one end of the operating lever 234 near the handle 2341, the other end of the first link lever 2361A is rotatably connected to one end of the second link lever 2361B. The other end of second link lever 2361B is rotatably connected to the sleeve portion 2321A of the grasp member 2321. One end of the third link lever 2361C is rotatably connected to the middle position of the second link lever 2361B, the other end of the third link lever 2361C is rotatably connected to the fastening ring 2322, such that the operating lever 234 is rotatably connected to the latching member 232.

The resilient portion 23 further includes a spring 238 received in the groove 2301A of the receiving portion 2301 near the fulcrum portion 2302, such that the latching member 232 is resisted between the spring 238 and the resisting wall 2301B of the receiving portion 2301 and configured for restoring the latching member 232 to an original position.

In assembly, the end of the extending portion 212 with the rack portion 212B is inserted through the latching member 232 and received in the through hole 2302C of the fulcrum portion 2302 with the rack portion 212B facing the opening 2302D, such that the latching end 2303A of the latching unit 2303 resists the rack portion 212B of the extending portion 212 of the supporting portion 21. The spring 238 is received in the groove 2301A via the curved recess 2301C of the resisting wall 2301B and is sandwiched between the fulcrum portion 2302 and the latching member 232.

The operating lever 234 is rotatably connected to the first supporting walls 2302B of the fulcrum portion 2302 by passing a first pivot shaft 2342 through the end of the operating lever 234 near the handle 2341 and fixed in the first pivot holes 2302G, such that the handle 2341 of the operating lever 234 is positioned above the driven end 2303B of the latching unit 2303.

Figure 8:
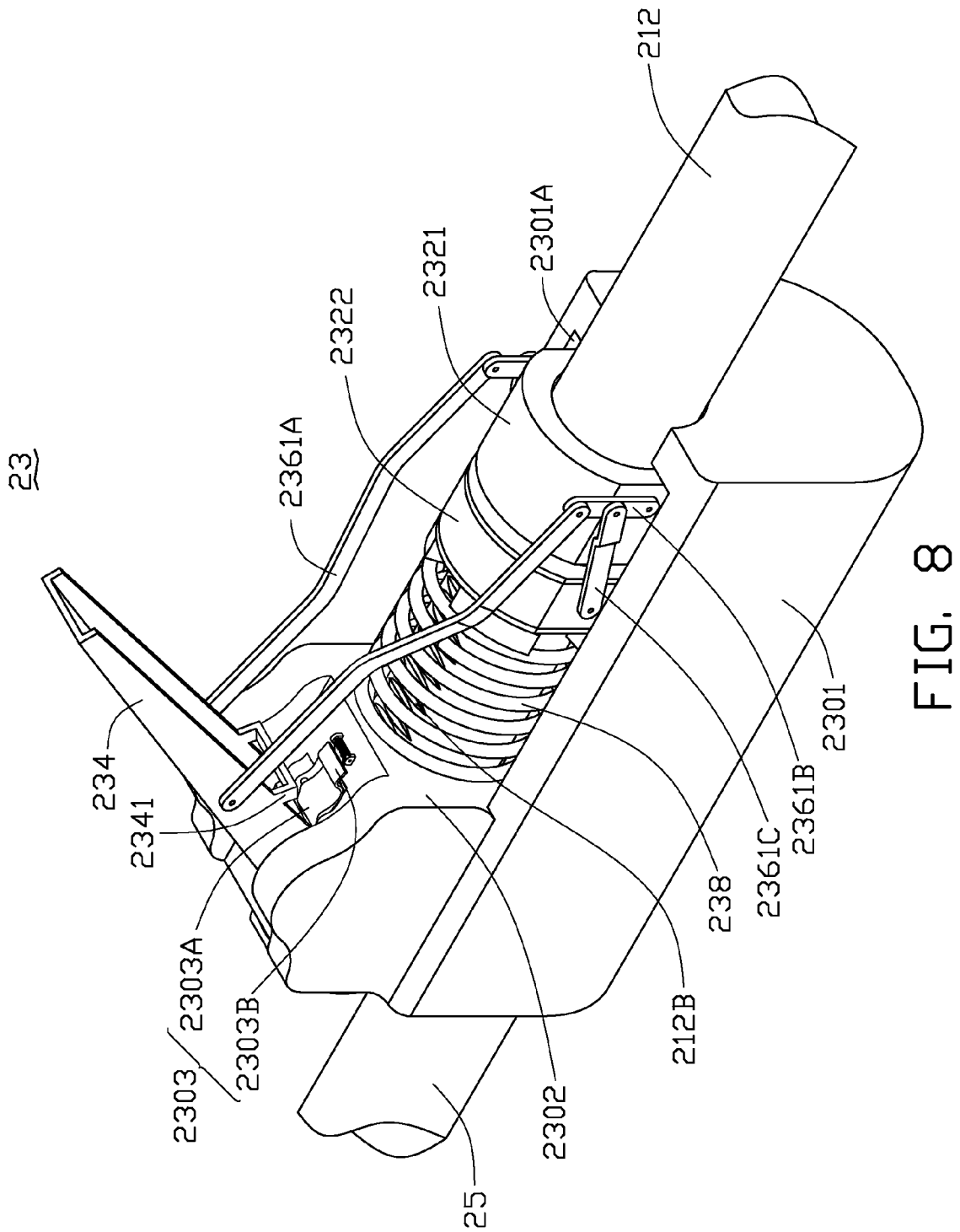
FIG. 8 is an isometric, assembled view of the resilient portion of FIG. 1.
Figure 9:
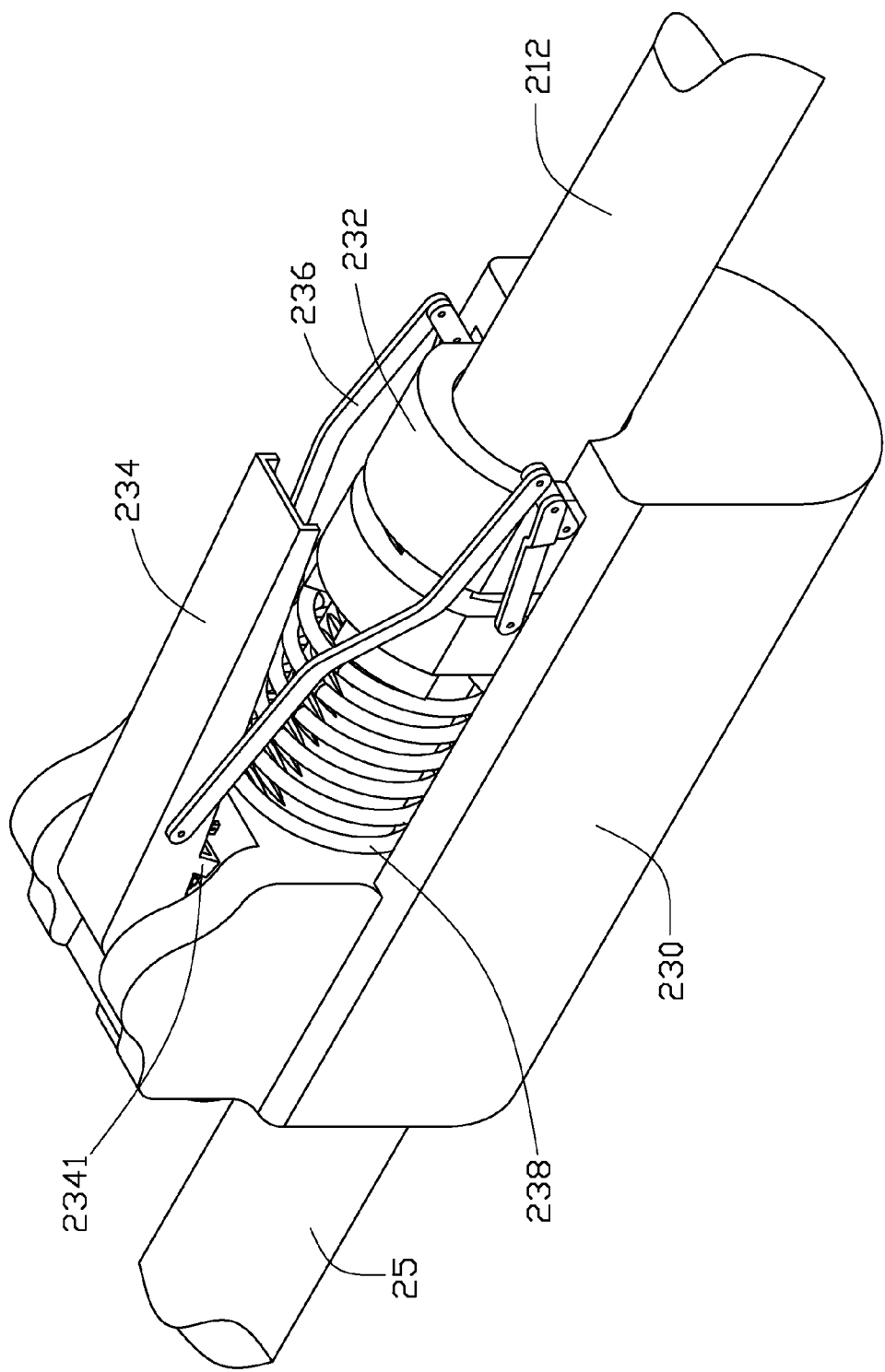
FIG. 9 is another status of the resilient portion of FIG. 8.

Referring to FIG. 8 and FIG. 9, the assembled views of the resilient portion 23 at two different states are shown. If the extending portion 212 of the supporting portion 21 does not need to be adjusted, the rack portion 212B of the extending portion 212 is resisted by the latching end 2303A of the latching unit 2303. If the extending portion 212 needs to be adjusted, the operating lever 234 is rotated around the first pivot shaft 2342 and pulled away from the latching member 232. When the operating lever 234 is rotated, the second link lever 2361B is driven to rotate about the grasp member 2321 by the first link lever 2361A, the third link lever 2361C is driven by the second link lever 2361B to drive the fastening ring 2322 to slide along the gripping portion 2321B of the latching member 232 away from or toward the sleeve portion 2321A of the grasp member 2321. The gripping portion 2321B can tightly grasps the extending portion 212 when the fastening ring 2322 slides, thus the extending portion 212 is pulled into the through hole 2302C of the fulcrum portion 2302 by the latching member 232.

When the operating lever 234 is rotated to the largest angle, the latching end 2303A of the latching unit 2303 moves down and engages with the rack portion 212B of the extending portion 212 due to the elastic force of the resilient unit 2304, therefore, the engagement of the latching end 2303A on the rack portion 212B prevents the extending portion 212 from sliding away from the grasp portion 25. The extending portion 212 can be continually adjusted into the through hole 2302C to shorten the extending length of the arms 20 by pulling the operating lever 234 along a direction away from the latching member 232 repeatedly.

The latching member 232 can be driven back to the original position under the resilient force of the spring 238 or by pushing the operating lever 234 towards the fulcrum portion 2302. When the operating lever 234 moves from the largest angle to the original angle, the fastening ring 2322 is pulled towards the sleeve portion 2321A of the grasp member 2321 along the gripping portion 2321B. Then the extending portion 212 is loosened from the grasp member 2321 to adjust the length of the arms 20.

When the tightening force between the extending portion 212 and the grasp portion 25 has reached the maximal static friction force between the grasp member 2321 and the extending portion 212, the length of the arms 20 (shown in FIG. 1) cannot be shortened any more. The value of the maximal static friction force can be designed choice and is no more than the largest value of the tightening force the flat panel display 300 can endure. With such a structure, the resilient portion 23 can protect the flat panel display 300 from damages.

If the extending portion 212 of the supporting portion 21 needs to be lengthened, the end of the operating lever 234 is pressed down towards the joint member 230. When pressing down the operating lever 234, the driven end 2303B of the latching unit 2303 is also pressed by the handle 2341 down to the top surface 2302A of the fulcrum portion 2302, through the opening 2302D, to release the latching end 2303B thereof from the rack portion 212B. Thus, the extending portion 212 can be pulled out from the through hole 2302C of the resilient portion 23 to elongate the length of the arms 20.

Figure 2:
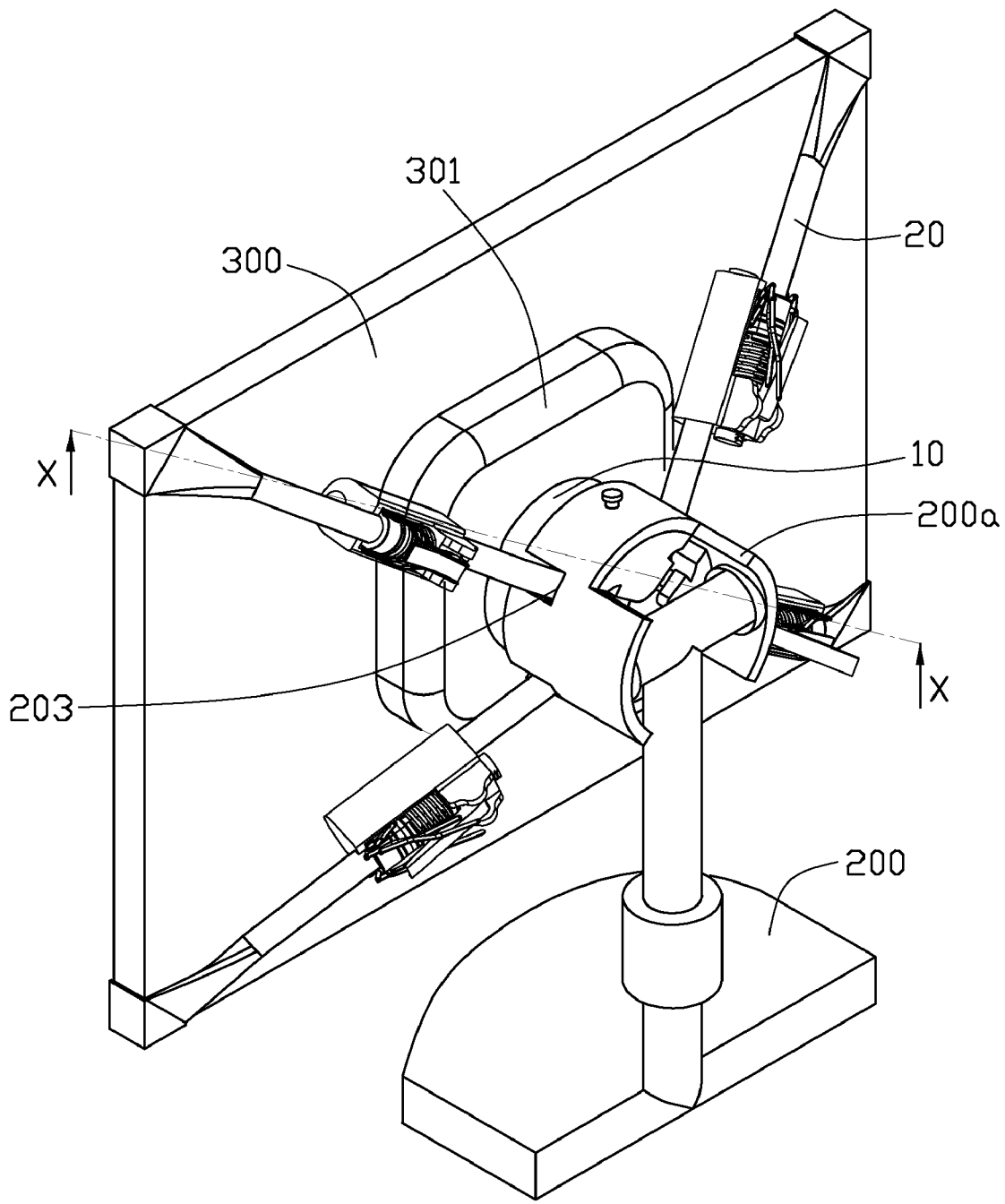
FIG. 2 is an isometric, assembled view of the flat panel display assembly of FIG. 1.
Figure 10:
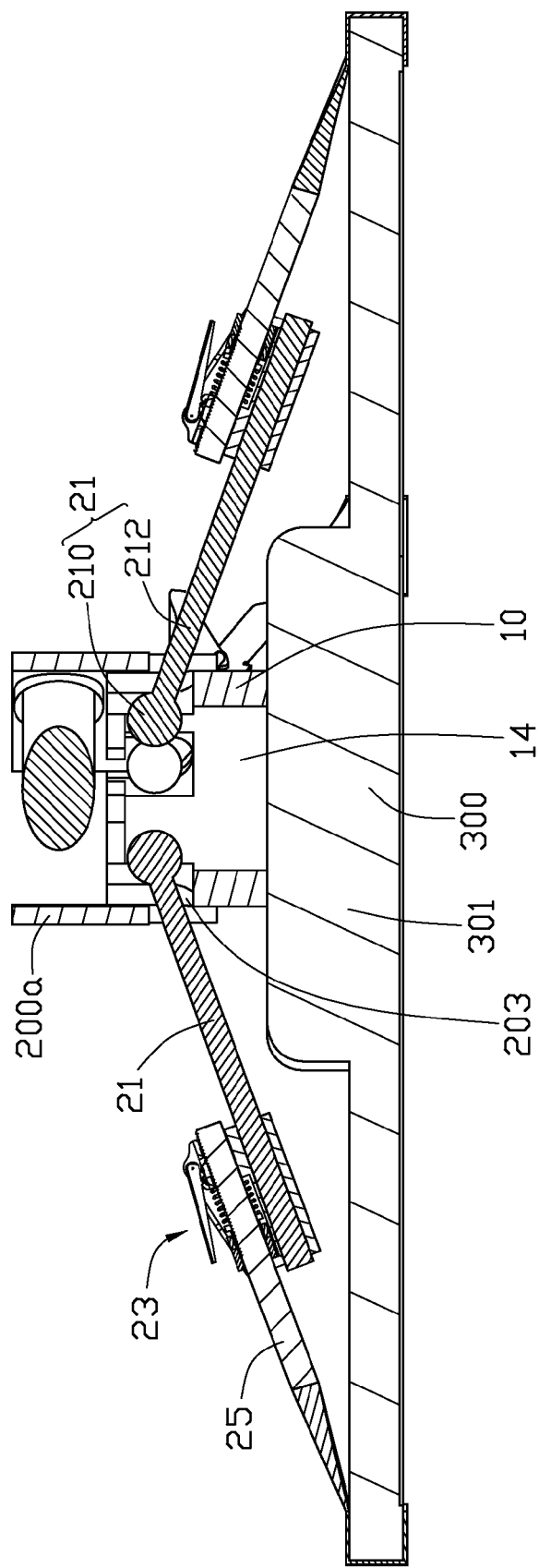
FIG. 10 is an isometric, cross-sectional view of the flat panel display assembly take along line X-X of FIG. 2.

Referring to back to FIGS. 1-3 together with FIG. 10, the base 200 includes a casing 200a configured for housing the chassis 10. The casing 200a is cylindrical-shaped. The inner diameter of the casing 200a is larger than the outer diameter of the chassis 10 so that the casing 200a can be sleeved on the chassis 10. The casing 200a includes a case body 201. The case body 201 defines four separate cutouts 202 corresponding to the side openings 14A. The cutouts 202 and the side openings 14A are partially aligned when the chassis 10 is received in the casing 200a and corporately define a number of sliding grooves 203. As a result, when each hook 250 of the arms 20 is fixed to the corner of the flat panel display 300, the supporting portion 21 of the arms 20 can move in the sliding groove 203 defined between an edge of the side openings 14A and an edge of the cutouts 202. That is, angles of the arms 20 relative to the flat panel displays 300 are adjustable in order to adjust the supporting portion surface 11 of the chassis 10 following the sliding of the supporting portion 21 to resist the hump 301 with different height. Therefore, the brace 100 can lock different flat panel displays 300 with different thickness. In order to firmly fix the chassis 10 to the casing 200a, a first screw hole 204 is defined on the casing 200a and a second screw hole 16 is also defined on the chassis 10 corresponding to the first screw hole 204. A bolt 205 is provided to threadedly engage in the first and second screw holes 204, 16 for fastening the chassis 10 in the casing 200a.

When assembling the supporting structure 5, the arms 20 are firstly inserted into the chassis 10 and then the chassis 10 is sleeved into the casing 200a of the base 200. Finally, the chassis 10 is fixed in the casing 200a via the bolts 205. Therefore, the length of the arms 20 and the angle of the arms 20 can be adjusted in order to support flat panel display 300 having different dimension.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A supporting structure for a flat panel display, the supporting structure comprising:
   a brace locking the flat panel display, the brace comprising:
      a chassis comprising a supporting portion surface, an opposite grasp portion surface, and a side surface connecting the supporting portion surface and the grasp portion surface, the supporting portion surface being positioned against a back surface of the flat panel display; the chassis defining a plurality of side openings in the side surface; and
      a plurality of arms being adjustable in length and each of the arms comprising a supporting portion, a grasp portion, and a resilient portion connecting the supporting portion and the grasp portion, a first end of the supporting portion being rotatable connected to the chassis, a second end of the supporting portion being adjustably connected with the resilient portion which comprises a grasp member sleeved on the supporting portion to grasp the supporting portion, and a fastening ring being movably sleeved on the grasp member and capable of driving the grasp member to grasp or release the supporting portion to adjust the tightness of the supporting portion, a first end of the grasp portion being fixed to the resilient portion, and a second end of the grasp portion configured for fastening the flat panel display; and
   a base comprising a casing sleeved on the chassis therein and configured for latching with the arms, the casing defining a plurality of cutouts corresponding to the side openings and cooperating with the side openings to define a plurality of sliding grooves for the arms sliding therein respectively to adjust an angle between the arms and the chassis.

2. The supporting structure as claimed in claim 1, wherein the chassis defines a receiving cavity therein, all of the side openings communicated with the receiving cavity.

3. The supporting structure as claimed in claim 1, wherein the number of the side openings is four.

4. The supporting structure as claimed in claim 1, wherein a plurality of ledges forms on an inner side surface of the chassis corresponding to the side openings.

5. The supporting structure as claimed in claim 4, wherein each ledge comprises a ledge surface facing the grasp portion surface and is substantially parallel to the grasp portion surface, the distance between the ledge surface and the grasp portion surface being larger than the length of the side openings.

6. The supporting structure as claimed in claim 2, wherein the first end of the supporting portion connected to the chassis is rotatably received in the receiving cavity, and the second end of the grasp portion opposite to the first end fixed to the resilient portion comprises a hook engaging with a corner of the flat panel display.

7. The supporting structure as claimed in claim 2, wherein the supporting portion comprises a spherical portion and an extending portion connected to the spherical portion, the diameter of the spherical portion being smaller than the diameter of the receiving cavity and larger than the diameter of the side opening on the side surface.

8. The supporting structure as claimed in claim 7, wherein the extending portion comprises a cylindrical portion and a rack portion on one end opposite to the spherical portion, the rack portion comprising a plurality of teeth on the cylindrical surface of the extending portion.

9. The supporting structure as claimed in claim 7, wherein the resilient portion comprises:
a joint member connecting the extending portion of the supporting portion and the grasp portion;
a latching member comprising the grasp member and the fastening ring and received in the joint member and latching the extending portion;
an operating lever rotatably connected to the joint member and configured for adjusting the tightness of the extending portion; and
a connecting member connecting the latching member and the operating lever, wherein when the operating lever is rotated, the connecting member drives the latching member to grasp or release the extending portion.

10. The supporting structure as claimed in claim 9, wherein the joint member comprises a receiving portion and a fulcrum portion formed on the receiving portion, the latching member received in the receiving portion.

11. The supporting structure as claimed in claim 10, wherein the fulcrum portion defines a through hole therein and comprises a top surface defining an opening thereon, the opening communicating with the through hole.

12. The supporting structure as claimed in claim 10, wherein the joint member further comprises a latching unit, the latching unit comprising a latching end and a driven end opposite to the latching end, the latching unit rotatably connected to the fulcrum portion.

13. The supporting structure as claimed in claim 12, wherein the joint member further comprises a resilient unit driving the driven end of the latching unit, the resilient unit comprising a plurality of resilient ends, the resilient unit rotatably connected to the fulcrum portion with one of the resilient ends resisting the driven end of the latching unit and another of the resilient ends resisting the fulcrum portion.

14. The supporting structure as claimed in claim 1, wherein the grasp member comprises a sleeve portion and a gripping portion, the gripping portion comprising a plurality of independent resilient claws, a limiting block integrally formed on a distal end of each claw for preventing the fastening ring from disengaging off the gripping portion.

15. The supporting structure as claimed in claim 9, wherein the connecting member comprises two link lever portions, and each link lever portion comprises a first link lever, a second link lever and a third link lever; the first link lever, the second link lever, and the third link lever rotatably connected to each other in sequence.

16. The supporting structure as claimed in claim 10, wherein the resilient portion further comprises a spring received in the receiving portion and positioned between the latching member and the fulcrum portion.

17. The supporting structure as claimed in claim 1, wherein the casing defines at least one first screw hole thereon and the chassis defines at least one second screw hole thereon corresponding to the first screw hole, the chassis fixed in the casing by at least one bolt threadedly engaging in the first and second screw holes.

18. A flat panel display assembly comprising:
a flat panel display comprising a back surface; and
a supporting structure supporting the flat panel display, the supporting structure comprising:
a brace locking the flat panel display, the brace comprising:
a chassis comprising a supporting portion surface, an opposite grasp portion surface, and a side surface connecting the supporting portion surface and the grasp portion surface, the supporting portion surface being positioned against the back surface of the flat panel display; the chassis defining a plurality of side openings on the side surface from the grasp portion surface; and
a plurality of arms being adjustable in length and each of the arms comprising a supporting portion, a grasp portion, and a resilient portion connecting the supporting portion and the grasp portion, a first end of the supporting portion being rotatable connected to the chassis, a second end of the supporting portion being adjustably connected with the resilient portion which comprises a grasp member sleeved on the supporting portion to grasp the supporting portion, and a fastening ring being movably sleeved on the grasp member and capable of driving the grasp member to grasp or release the supporting portion to adjust the tightness of the supporting portion, a first end of the grasp portion being fixed to the resilient portion, and a second end of the grasp portion fastening the flat panel display; and
a base comprising a casing sleeved on the chassis therein and configured for latching with the arms, the casing defining a plurality of cutouts corresponding to the side openings and cooperating with the side openings to define a plurality of sliding grooves for the arms sliding therein to adjust an angle between the arms and the chassis corresponding to different thickness of the flat panel display.

19. A supporting structure for a flat panel display, the supporting structure comprising:
a brace locking the flat panel display, the brace comprising:
a chassis comprising a supporting portion surface, an opposite grasp portion surface, and a side surface connecting the supporting portion surface and the grasp portion surface, the supporting portion surface being positioned against a back surface of the flat panel display; the chassis defining a plurality of side openings in the side surface and a receiving cavity therein communicating with the side openings;
a plurality of arms being adjustable in length and each of the arms comprising:
a supporting portion comprising a spherical portion and an extending portion at a first end, the spherical portion being rotatably received in the receiving cavity;
a grasp portion, one end of the grasp portion comprising a hook engaging with a corner of the flat panel display; and
a resilient portion being adjustably connected with a second end of the supporting portion, comprising:
a joint member connecting the extending portion of the supporting portion and the grasp portion;
a latching member received in the joint member and latching the extending portion, the latching member comprising a grasp member sleeved on the extending portion to grasp the extending portion and a fastening ring moveably sleeved on the grasp member and capable of driving the grasp member to grasp or release the extending portion;
an operating lever rotatably connected to the joint member to adjust the tightness of the extending portion; and
a connecting member connecting the latching member and the operating lever, wherein when the operating lever is rotated, the connecting member drives the latching member to grasp or release the extending portion; and a base comprising a casing sleeved on the chassis therein and configured for latching with the arms, the casing defining a plurality of cutouts corresponding to the side openings and cooperating with the side openings to define a plurality of sliding grooves for the arms sliding therein respectively to adjust an angle between the arms and the chassis.

* * * * *